United States Patent [19]

Wang et al.

[11] 4,105,954
[45] Aug. 8, 1978

[54] DOUBLE-CONFINED MULTIPLE ANODE HOLLOW CATHODE LASER

[75] Inventors: Shing Chung Wang, Temple City; Randolph W. Hamerdinger, Glendale, both of Calif.

[73] Assignee: Xerox Corporation, Stamford, Conn.

[21] Appl. No.: 701,472

[22] Filed: Jul. 1, 1976

[51] Int. Cl.² ............................................. H01S 3/00
[52] U.S. Cl. ........................ 331/94.5 PE; 331/94.5 D
[58] Field of Search ................... 331/94.5 PE, 94.5 D

[56] References Cited

U.S. PATENT DOCUMENTS 3,868,593  2/1975  Fukuda ........................... 331/94.5 D
3,878,479  4/1975  Heising ........................... 331/94.5 T
4,031,428  6/1977  Tokudome ........................... 315/111

Primary Examiner—Martin H. Edlow
Attorney, Agent, or Firm—James J. Ralabate; Franklyn C. Weiss; Irving Keschner

[57] ABSTRACT

An improved device for promoting the emission of radiation by utilizing electrical energy to raise material from an initial state to an excited state is disclosed. The device includes enclosed means, including an elongated body section defining a first electrode and a pair of end sections, for enveloping a space occupied by the material. The device further includes a second electrode, adapted to receive electrical energy, disposed in fixed relationship with the first electrode for distributing the electrical energy thereto.

6 Claims, 4 Drawing Figures

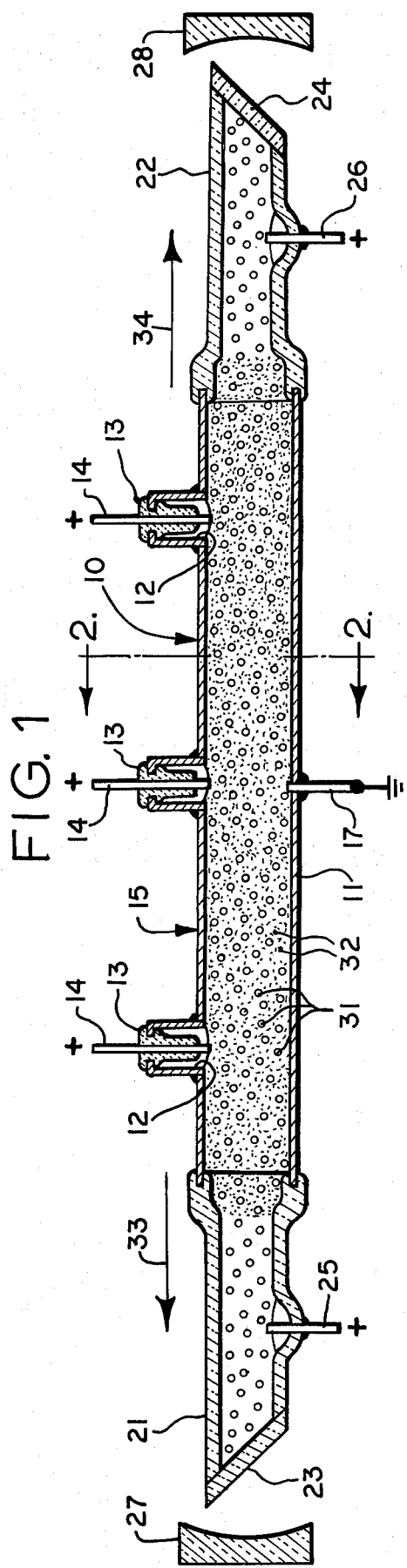
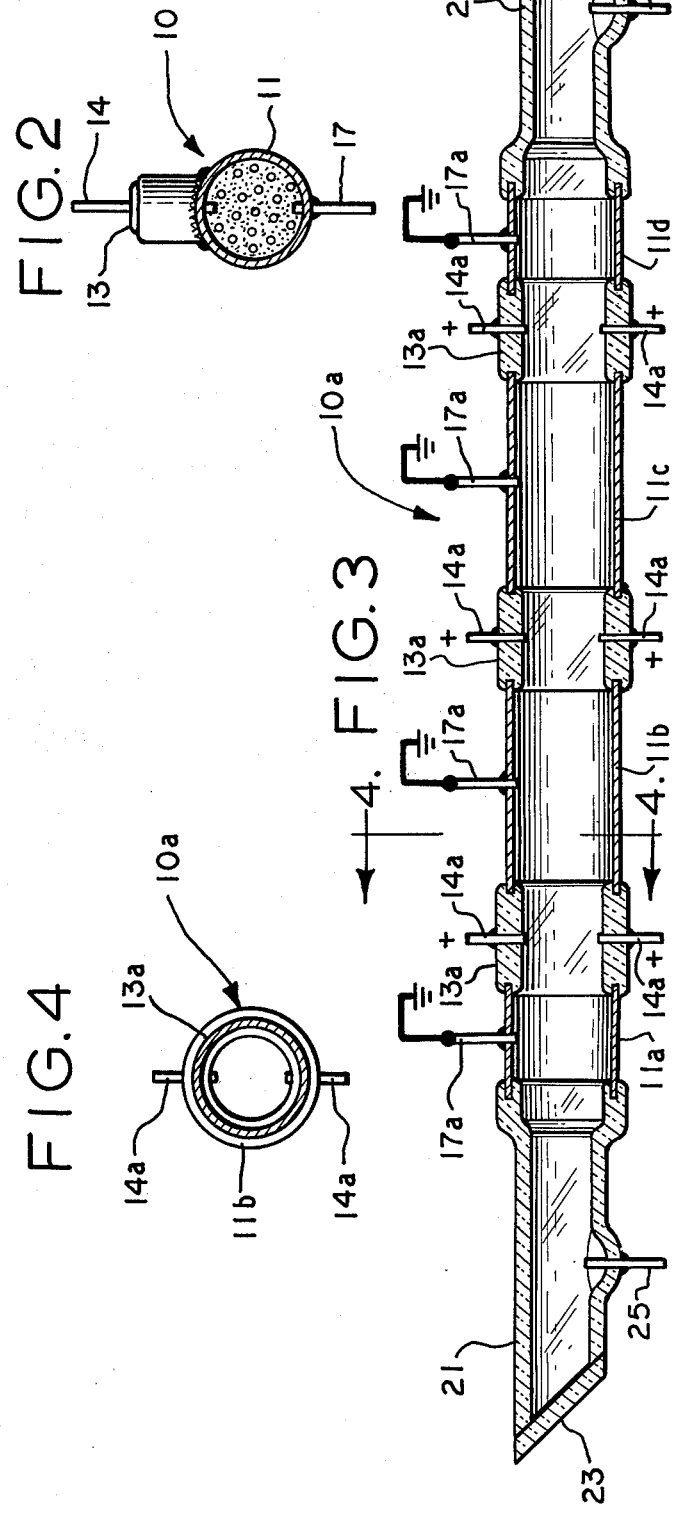

DOUBLE-CONFINED MULTIPLE ANODE HOLLOW CATHODE LASER

BACKGROUND OF THE INVENTION

This invention relates to radiation emission devices in general, and in particular to radiation emission devices of the type which are frequently referred to as lasers. Lasers are generally characterized by an elongated envelope containing a material which can be raised from an initial energy state to a so-called excited energy state. The particular means used to excite the material in the envelope may vary. Thus, depending on the type of laser used, optical, electrical or chemical excitation means may be employed.

After excitation, radiation may be emitted spontaneously as the excited material returns to a more stable energy level and/or through stimulated emission. In either case, the wavelength of the radiation so emitted is a function of the quantum drop in the energy level of the excited material. This, in turn, depends upon the inherent characteristics of the material itself.

The radiation, which propagates at a constant wavelength, generally leaves the envelope via radiation transmission means disposed at both ends thereof. The radiation transmission means are typically translucent windows which are often, but not necessarily, inclined at an angle which optimizes a particular polarization of light. This inclination is usually referred to as Brewster's angle, and the windows so inclined are often characterized as Brewster's windows.

Lasers of the type described typically include reflection means such as concave mirrors located a predetermined distance beyond each translucent window. The mirrors are aligned such that the radiation emitted from a translucent window is reflected back into the envelope to stimulate the emission of a substantially increased amount of radiation which then passes through the opposite window. This increased radiation is likewise reflected back into the envelope by the other mirror, thereby increasing the emitted radiation even more. As the radiation is continuously reflected back and forth through the envelope, greater and greater amounts of radiation are produced. It is in this manner that the light energy used to initially stimulate the emission of radiation is "amplified" by the laser device. Of course, in order to enable the amplified radiation to escape therefrom, at least one of the mirrors is gnerally made only partially reflective.

Many different materials may be used to effect radiation emission, including certain members of the class of materials known as metals. Because the metals used in this type of laser must generally be transformed from a normally solid or liquid state, to a gaseous state in order to effect excitation, such lasers are frequently referred to as metal vapor lasers. It is thus clear that in metal vapor lasers, means must be provided which first vaporize the metal and then raise the vaporized metal from an initial energy state to an excited energy state.

In the past, this has sometimes been accomplished by providing, within the laser envelope, a pair of substantially flat electrodes—typically an anode and a cathode. Upon application of a predetermined voltage to the anode, electrical energy is conducted to the cathode by any suitable means, causing the cathode to heat up in a well-known manner. The heat of the cathode causes the metallic material confined in the envelope to become vaporized so that it can then be readily raised to an excited state.

This type of system has not been without concomitant drawbacks. For example, the use of a pair of electrodes as described above tends to create undesirable temperature gradients within the laser envelope resulting in uneven heating, and nonuniform vaporization and excitation of the metal. In addition, it is well known that the vaporized metal tends to condense on the translucent windows located at the ends of the elongated envelope, thereby rendering the windows relatively opaque, and hence less capable of transmitting radiation.

In the past, attempts to remedy this condensation problem have included the use of cataphoretic means for establishing an electric field within the laser envelope. The electric field is typically arranged to accelerate the vaporized metal ion away from the region nearest the translucent windows, thereby confining the vaporized metal to the more central portions of the envelope. However, many prior metal vapor lasers have required relatively complicated, cumbersome, and inefficient apparatus to accomplish both excitation and confinement of the metal.

Accordingly, it is a primary object of the invention to provide an improved device for emitting radiation. It is another object of the invention to provide a metal vapor laser which minimizes temperature gradients within the laser envelope, and therefore promotes uniform vaporization and excitation of the metal. It is also an object of the invention to provide, in a metal vapor laser, a configuration which achieves excitation and cataphoresis in a more efficient, effective and economical manner.

Many lasers of the prior art, in addition to the drawbacks mentioned above, are characterized by a configuration in which the envelope is prone to failure in handling or operation. It is thus a further object of the invention to provide a more durable laser configuration which is less likely to fail under such circumstances. Other objects, features and advantages of the invention, as summarized below, will be apparent upon reading the following detailed description in conjunction with the accompanying drawings.

SUMMARY OF THE INVENTION

In accordance with the foregoing objects, there is provided a device for promoting the emission of radiation by utilizing electrical energy to help raise material from an initial state to an excited state. The device comprises enclosed means, including an elongated body section defining a first electrode and a pair of end sections terminating in radiation transmission means, for enveloping a space occupied by the material. The device further includes a second electrode, adapted to receive electrical energy, disposed in fixed relationship with the first electrode to distribute electrical energy thereto.

DESCRIPTION OF THE DRAWINGS

FIG. 1 is a schematic, cutaway view of an exemplary embodiment of a device for promoting the emission of radiation;

FIG. 2 is a sectional view taken along lines 2—2 of FIG. 1;

FIG. 3 is an alternative aspect of the embodiment shown in FIG. 1; and

FIG. 4 is a sectional view taken along lines 4—4 of FIG. 3.

DETAILED DESCRIPTION OF AN EXEMPLARY EMBODIMENT

Referring now to the drawings, and in particular to FIGS. 1 and 2, there is shown a device for promoting the emission of radiation in the form of a laser 10. Laser 10 is characterized by enclosed means 15 including an elongated body section 11 and a pair of end sections 21, 22. Initially, enclosed means 15 may include a passage (not shown) for inserting a host material, such as a gas, inside laser 10. Similarly, a doping material, such as a metal, may be initially deposited within body section 11. Thereafter, enclosed means 15 is typically hermetically sealed to prevent the gaseous and/or metallic material from escaping.

In this embodiment, body section 11 of laser 10 serves as a cathode, and is therefore fabricated from electrically conductive material such as stainless steel, molybdenum, or the like. The cathode is ordinarily connected via a terminal 17 to a point of relatively low voltage such as ground. To maximize energy efficiency, and to minimize temperature gradients within enclosed means 15, the cathode defined by body section 11 is preferably of cylindrical shape. The manner in which maximum energy efficiency and minimum temperature gradients are achieved is explained in greater detail hereinafter.

As indicated above, enclosed means 15 also include a pair of end sections 21, 22 which may be secured to body section 11 in any suitable manner, or formed integrally therewith. End sections 21, 22 terminate in corresponding radiation transmission means 23, 24. Radiation transmission means 23, 24 are typically formed from translucent material, such as glass, and may be inclined at Brewster's angle to maximize a particular polarization of light. Though end sections 21, 22 may also be fabricated from glass, in one aspect of this exemplary embodiment they are fabricated from substantially more durable material. When so fabricated, the chance of an accidental failure of enclosed means 15, such as breakage of end sections 21, 22 or body section 11, during handling or operation is greatly reduced.

Defined along the length of body section 11 are a plurality of openings 12. An insulating plug 13 is fixedly inserted into each of openings 12, and a anode 14 communicating between the ambient air and the space enveloped by enclosed means 15 is passed through each plug 13. In this particular aspect of the exemplary embodiment each anode 14 is substantially equally spaced along body section 11 and has a lower end extending nearly to the inner wall of the cathode. The upper end of each anode 14 is typically coupled to a source of electrical energy such as a positive potential of about 300 volts.

As explained above, a gaseous host material and a metallic doping material are typically inserted inside laser 10 prior to enclosed means 15 being hermetically sealed. Though the types and amounts of such materials may vary, it is suggested that helium at a pressure of about 4-10 torrs may be used as the host material, and cadmium, in quantities of approximately 1-2 grams, may be used as the doping material. As shown best in FIG. 1, the host material and the doping material are represented by reference numerals 31 and 32, respectively.

After the desired types and quantities of host material and doping material have been added, and enclosed means 15 are properly sealed, the predetermined voltage may be applied to anodes 14. Upon application of this predetermined voltage some of the atoms of the host material 31 become ionized while others are raised to the excited state. The ionized and excited host material and electrons define a conductive path between anodes 14 and the cathode defined by body section 11. As a result, the cathode is substantially uniformly heated to a temperature of about 300° C.

Because of its cylindrical shape, equally spaced anodes 14, and balanced electrical energy input, the cathode defined by body section 11 is heated substantially uniformly. As a result, temperature gradients inside body section 11 are minimized, thereby promoting uniform vaporization of doping material 32. The vaporized doping material invariably collides with the host material to create an energy exchange therebetween. This energy exchange raises the doping material from its initial energy state to an ionized excited energy state, characterized by a positive electrical charge. Simultaneously, the host material returns to its initial state. However, the continuous application of about 300 volts at anodes 14 creates a constant supply of ionized and excited host material within enclosed means 15 to promote further energy exchanges with the vaporized doping material.

The excited doping material may return to its initial energy state spontaneously and/or through stimulated emission. In the process of returning to its initial energy state, radiation is emitted at a frequency which is dependent upon the internal properties of the excited material. Thus, for cadmium, a characteristic red, green and blue light are emitted through windows 23, 24.

Disposed beyond each of windows 23, 24 are concave mirrors 27, 28. In a manner well known in the art, mirrors 27, 28 reflect the radiation emitted through windows 23, 24 back into enclosed means 15 to stimulate the emission of increased amounts of radiation. These increased amounts of radiation then pass out of enclosed means 15 via windows 23, 24 until they are again reflected back inside the laser by mirrors 27, 28. Thus, as explained above, the stimulated radiation is "amplified" many times by laser 10. Of course, to allow the "amplified" energy to escape from the device, at least one of mirrors 27, 28 is made only partially reflective.

The device 10 is further characterized by cataphoretic means which, in this exemplary embodiment, include a pair of electrical terminals 25, 26 passing through end sections 21, 22, respectively. Electrical terminals 25, 26 are preferably connected to a positive voltage source, thereby establishing, inside end sections 21, 22 respective electric field gradients identified by reference numerals 33, 34. As shown in FIG. 1, electric field gradients 33, 34 are directed from the cathode defined by body section 11 toward terminals 25, 26, respectively. Consequently, the areas immediately in advance of windows 23, 24 are more positive than some of the more central areas of enclosed means 15. This cataphoretic effect tends to accelerate the positively charged, excited doping material away from the nearest of windows 23, 24 and toward body section 11. As a result, the excited doping material will generally be prevented from drifting too close to windows 23, 24 to condense thereon. Thus, all of the adverse effects that typically result from the condensation of vaporized metal onto windows 23, 24 are mitigated, if not completely eliminated.

Referring now to FIGS. 3-4, a device 10a which depicts another aspect of this exemplary embodiment is illustrated. Device 10a is virtually identical in construction and operation to that illustrated in FIGS. 1 and 2 except that some of the electrode connectors are somewhat different. More particularly, as shown in FIG. 3, the cathode is defined by a body section which is actually comprised of four substantially cylindrical subsections 11a, 11b, 11c and 11d, each connected to a source of low potential such as ground. Moreover, the subsections 11a–11d are respectively connected to interstitial, insulating rings 13a, 13b and 13c. Extending through each ring 13a–13c is a pair of diametrically-opposed anode terminals 14a. Anode terminals 14a are preferably connected to a positive voltage source of about 300 volts.

Upon application of this voltage, a conductive path is established to the cathode defined by each of body subsections 11a–11d in a manner previously explained. This, in turn, substantially, uniformly raises the cathode to a temperature of about 300° C., causing the doping material to become substantially uniformly vaporized. The doping material collides with the host material in the same manner as set forth above, thereby enabling the device to emit radiation. Thus, anode terminals 14a, disposed through rings 13a of device 10a, facilitates the uniform heating of the cathode defined by body subsections 11a–11d, to efficiently and effectively promote the emission of radiation.

Though the various aspects of the exemplary embodiment of the invention herein disclosed is preferred, it will be clear to those skilled in the art that numerous modifications and refinements can be made without departing from the true scope of the invention. Accordingly, all such modifications and refinements are intended to be covered by the appended claims.

We claim:

1. Apparatus for promoting the emission of radiation by utilizing electrical energy to raise metal vapor material from an initial state to an excited state comprising:
    enclosed means, including an elongated body section defining a first electrode and a pair of end sections terminating in means for transmitting radiation, for enveloping a space occupied by said material;
    a plurality of second electrodes each being substantially equally spaced, in electrically insulated relationship with said first electrode, longitudinally along the exterior of said body section; each of said second electrodes communicating with the space enveloped by said enclosed means, and being adapted to receive electrical energy for substantially uniform distribution through said space to said first electrode to substantially uniformly raise said material as distributed in said space from said initial state to said excited state; and
    cataphoretic means disposed along each of said end sections for establishing an electrical field within said space to accelerate said material away from the nearest one of said radiation transmission means and toward said first electrode.

2. The apparatus as defined in claim 1 wherein said body section defining said first electrode is substantially cylindrical.

3. The apparatus as defined in claim 2 wherein said body section is comprised of a plurality of separate subsections, and wherein said device further includes a plurality of insulating rings disposed interstitially relative to said subsections; at least one of said plurality of second electrodes extending through a corresponding one of said rings.

4. The apparatus as defined in claim 1 wherein said cataphoretic means include third electrode means, disposed along each of said end sections, communicating with the space enveloped by said enclosed means for establishing an electric field therein.

5. Apparatus for stimulating the emission of radiation by the excitation of metallic material from an initial energy state to an excited energy state comprising:
    enclosed means for enveloping a predetermined space occupied by said metallic material; said enclosed means comprising a substantially hollow cylindrical cathode and having a pair of end sections each terminating in means for transmitting radiation;
    a plurality of subtantially equally spaced anodes disposed, in electrically insulated relationship with said cathode, longitudinally relative to the outer surface of said cathode; said anodes being adapted to receive electrical energy for substantially uniform passage through said space to said cathode, and said cathode, upon receipt of said electrical energy, being heated to substantially uniformly vaporize and excite said metallic material; and
    cataphoretic means including a pair of terminals, one of said terminals being disposed along one of said end sections in advance of one of said radiation transmission means, and the other one of said terminals being disposed along the other one of said end sections in advance of the other one of said radiation transmission means; said cataphoretic means, upon receipt of electrical energy at each of said pair of terminals, being adapted to establish an electrical field within said enclosed means for urging said vaporized metallic material away from the nearest of said radiation transmission means and toward said cathode to minimize the condensation of said vaporized metallic material on said radiation transmission means.

6. The apparatus as defined in claim 5 wherein said cylindrical cathode is comprised of a plurality of separate cathode subsections, and wherein said apparatus further includes a plurality of insulating rings disposed interstitially relative to said subsections, said anodes extending through a corresponding one of said rings.

* * * * *